United States Patent [19]

Schirmer

[11] 4,425,172
[45] Jan. 10, 1984

[54] MANIFOLDS FOR STRUTTED FILM

[75] Inventor: Henry G. Schirmer, Spartanburg, S.C.

[73] Assignee: W. R. Grace & Co., Cryovac Division, Duncan, S.C.

[21] Appl. No.: 319,761

[22] Filed: Nov. 9, 1981

[51] Int. Cl.³ .............................................. B32B 31/00
[52] U.S. Cl. .................................. 156/187; 156/215; 156/253; 405/51
[58] Field of Search ............... 156/185, 187, 184, 212, 156/215, 213, 252, 253; 285/188; 138/99; 405/36, 43, 51

[56] References Cited

U.S. PATENT DOCUMENTS 3,782,407 1/1974 Blackwell ..................... 285/188 X,
3,907,625 9/1975 Vogelsanger ..................... 156/253

Primary Examiner—David A. Simmons
Attorney, Agent, or Firm—John J. Toney; William D. Lee, Jr.; Joseph P. Harps

[57] ABSTRACT

The invention deals with means for producing a manifold for a strutted film. In particular, the connection of a plastic tubular conduit to a strutted film to form a fluid tight communication between the strut passageway and the interior of the conduit is disclosed. The present method is especially advantageous where the struts of the strutted film, as a result of their method of manufacture, are not readily heat sealable. Where necessary, the method may also be applied to provide a manifold for a group of individual tubes.

10 Claims, 7 Drawing Figures

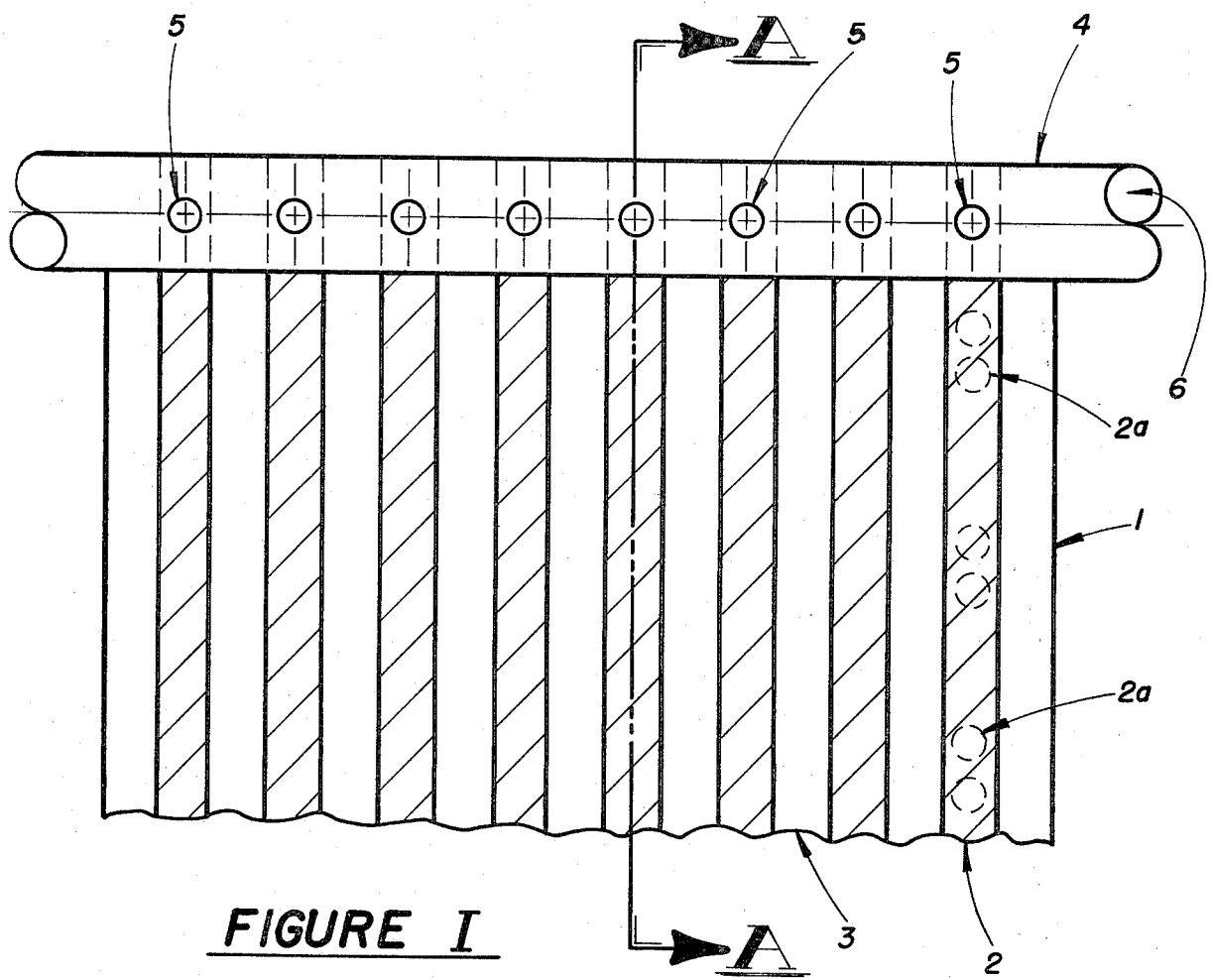
FIGURE I
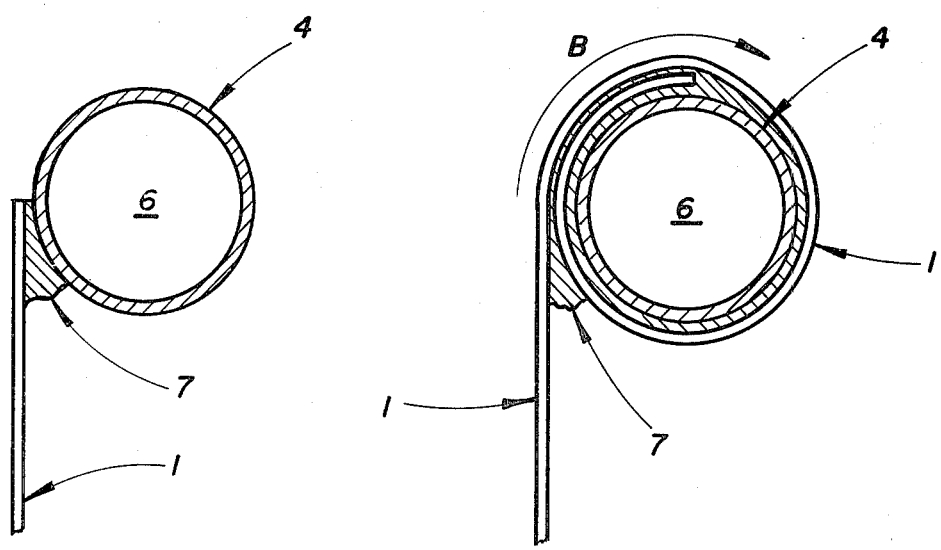
FIGURE II  FIGURE III

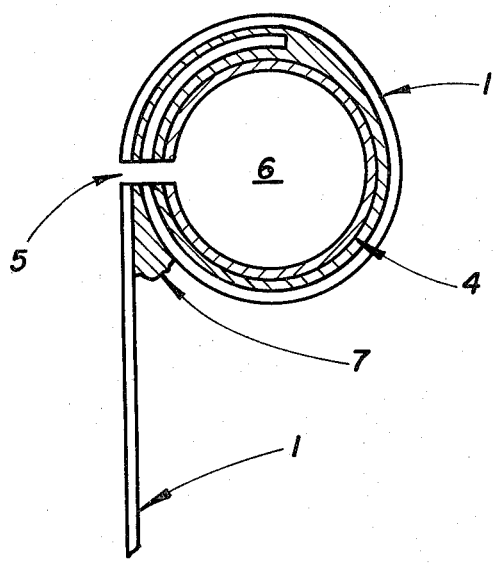
FIGURE IV
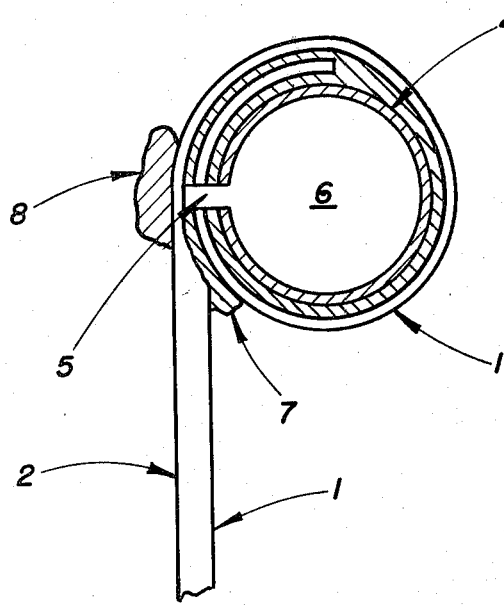
FIGURE V
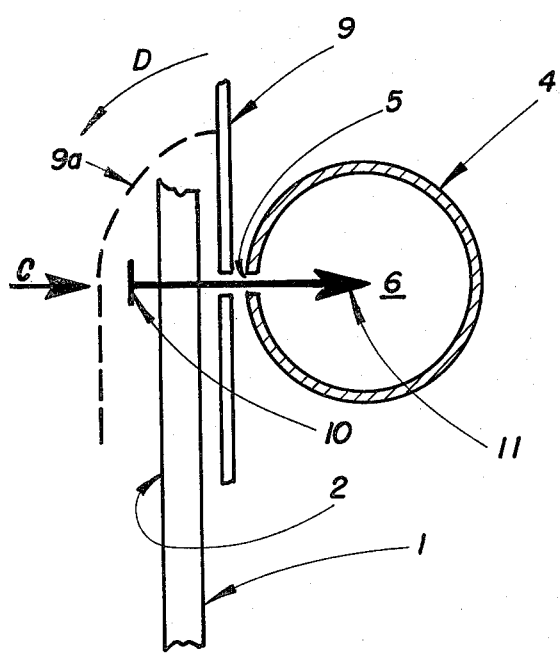
FIGURE VI
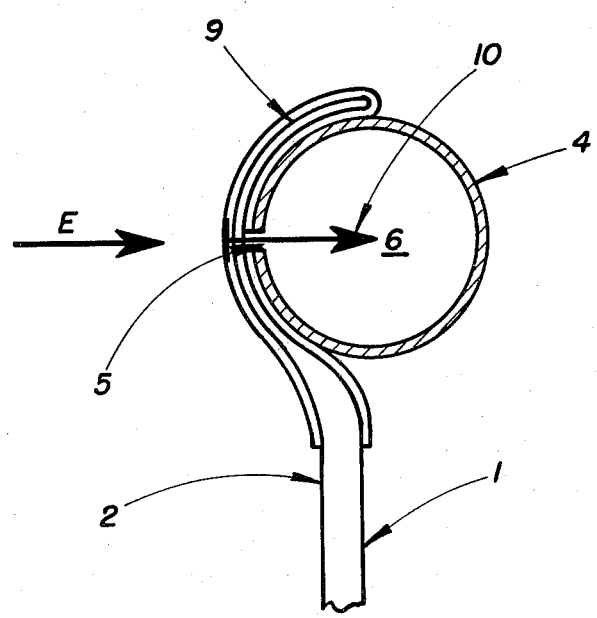
FIGURE VII

MANIFOLDS FOR STRUTTED FILM

FIELD OF THE INVENTION

The field of the present invention encompasses the area of strutted films and, in particular, a novel process of interconnecting multiple struts which are of irregular widths and spacings and depending upon the process by which they are manufactured, may not readily be heat sealable.

BACKGROUND OF THE INVENTION

The present inventive process and product produced thereby has evolved as an answer to problems which have been encountered in providing a manifold for interconnecting the struts of a strutted film wherein the struts are of irregular widths and spacings. The present invention also overcomes the problems confronting those skilled in the art when attempting to interconnect struts in a fluid tight manner which, as a result of their method of manufacture, are not readily interconnectable by heat sealing.

The terminology "strutted films" is used herein to generally refer to films which have been provided with internal passageways through which liquids or other materials may readily flow. One major area of application for such films is the solar energy area where the films may be utilized as solar collectors through appropriate placement and location. Another possible utilization for strutted films is in irrigation. In this utilization the strutted passageways are provided with spaced-apart orifices whereby the liquid passing therethrough may exit the passageways at appropriate locations and rates.

One method of manufacturing a strutted film is by coextrusion whereby an incompatible and thus non-adhering material is extruded internally and thus trapped between the extruded layers. After extrusion, the internally trapped, incompatible, non-adhering material may be physically separated from the adjoining surrounding layers and thereby provide an internal passageway or strut through the extruded film. Since the internally extruded material is, by its very nature, incompatible with at least one interior surface of one adjoining layer, problems have arisen in attempting to seal off the strutted film by heat sealing. In fact, closing of the struts by heat sealing has been found to be extremely difficult if not impossible.

OBJECTS OF THE PRESENT INVENTION

It is a principle object of the present invention to provide a novel method for interconnecting multiple struts wherein the aforementioned disadvantages can be obviated.

It is another object of the present invention to provide a novel method for interconnecting the multiple struts of a strutted film to form a fluid tight continuous flow path.

It is also an object of the present invention to provide a novel method for interconnecting the struts of a strutted film wherein it is difficult, if not impossible, to close the struts through heat sealing.

Another object of the present invention is to provide a novel method for interconnecting the struts of a strutted film wherein the struts are of irregular widths and spacings.

Yet another object of the present invention is to provide, in combination, a strutted film with a manifold therefore.

Still further objects and the broad scope of applicability of the present invention will become apparent to those of ordinary skill in the art from the details given hereinafter. However, it should be understood that the detailed description and the presently indicated preferred embodiments of the instant invention are given by way of illustration only since various changes and modifications well within the spirit and scope of the present invention will become apparent to those of ordinary skill in the art upon review of the following detailed description of the presently preferred embodiments.

SUMMARY OF THE INVENTION

The above discussed objects, and other objects which will hereafter become apparent, are attained in accordance with the present inventive method and the product produced thereby. According to the principles of the present invention, the struts of a strutted film are provided with a fluid tight interconnecting manifold through association with a transversely aligned conduit such as a plastic pipe. The conduit may be attached to the strutted film by application of an adhesive followed by a winding motion or, alternatively, by providing a heat sealable film which acts to sheath and seal the strutted film to the conduit. In both applications coupling orifices which allow communication between the interior of the conduit and the struts are provided.

It should be noted that an important feature of the present invention is that a continuous, fluid tight passageway is provided even though the struts may be of irregular widths and spacings. Additionally, the present invention may be utilized even though the strutted passageways of the strutted film are not closable by heat sealing.

Those skilled in the art will readily recognize that the present inventive method may also be applied to provide a manifold for a group of individual tubes.

BRIEF DESCRIPTION OF THE DRAWINGS

FIG. 1 is a top plan view of a strutted film and associated plastic pipe manifold.

FIG. 2 is a cross-sectional view along line A—A of FIG. 1 of a first step of assembly of one embodiment of the present invention.

FIG. 3 is a cross-sectional view along line A—A of FIG. 1 of a second step of assembly of the embodiment of FIG. 2.

FIG. 4 is a cross-sectional view along line A—A of FIG. 1 of a third assembly step of the embodiment of FIG. 2.

FIG. 5 is a cross-sectional view along line A—A of FIG. 1 of the final product of the embodiment of FIG. 2.

FIG. 6 is a cross-sectional view along line A—A of FIG. 1 of a first assembly step as modified in accordance with a second embodiment of the present invention.

FIG. 7 is a cross-sectional view along line A—A of FIG. 1 of a final product of the modified embodiment of FIG. 6.

DETAILED DESCRIPTION OF THE PREFERRED EMBODIMENTS

Turning now to the figures, in which like reference numerals represent like structures, and, in particular, to FIG. 1 which represents a top plan view of a strutted film and associated plastic pipe manifold, it can be seen that strutted film 1 has been provided with alternating flow passageways or struts 2 and sealed areas 3. Conduit 4 may be formed from any desirable plastic tubing and is, itself, provided with flow passageway 6. The flow passageway 6 of conduit 4 is in communication with the flow passageways or struts 2 of strutted film 1. The communication of flow passageway 6 and struts 2 is accomplished by way of coupling orifices 5 located at appropriate points along conduit 4. The strutted film 1 and conduit 4 are attached to each other, in accordance with the present invention, so as to accomplish a fluid tight seal while, at the same time, accomplishing communication between passageway 6 and struts 2. Upon the fluid tight joining of conduit 4 and strutted film 1, as discussed above, it can be seen that the resultant product may be utilized as, for example, a solar panel wherein a heat absorbing fluid is introduced into passageway 6 of conduit 4, flows through coupling orifices 5, and into and through struts 2. The heat absorbing fluid, after absorbing solar energy from the strutted film, then flows on through struts 2 into a second conduit (not illustrated) and thereafter to a heat exchanging mechanism as is well known in the art.

Alternatively, the present inventive product may be utilized as an irrigation drip system. In this application the struts 2 of strutted film 1 are provided with exit orifices 2a whereby the irrigation fluid exits the struts 2 and irrigates the appropriate desired areas.

Turning to FIGS. 2–5 which illustrate, in stepwise fashion, a first method of completing the attachment of the conduit 4 to strutted film 1 in accordance with the principles of the present invention, it is seen that the initial joining of conduit 4 with strutted film 1 is accomplished by adhesive 7. Adhesive 7 may be any material which accomplishes a sturdy, fluid tight, joining of strutted film 1 to plastic conduit 4. However, a hot melt adhesive which is a melt blend of an ethylene vinyl acetate polymer having 19 percent, by weight, vinyl acetate units and a melt index of 30 and a low molecular weight hydrocarbon tackifier is preferred. An ethylene vinyl acetate copolymer meeting the above requisites is marketed under the trade name of U.S.I. No. 652. Additionally, a low molecular weight hydrocarbon tackifier which is found to be satisfactory is marketed under the trade name of Piccopale 100. Melt index is measured according to ASTM Test No. D-1238. If desired, the adhesive may be cross-linkable upon irradiation or by chemical addition as is well known in the art. An example of this type of adhesive is RTV silicone rubber adhesive which is manufactured by the General Electric Cooperation.

Turning to FIG. 3, the conduit 4 is then rolled as indicated by arrow B in order to wind strutted film 1 approximately one and one-half times around conduit 4. This action will result in the spreading of adhesive 7 around conduit 4 in a manner (illustrated in cross-section in FIG. 3) so as to trap adhesive 7 between conduit 4 and strutted film 1 and thereby securely adhere strutted film 1 to conduit 4.

FIG. 4 illustrates the next step in the complete attachment of conduit 4 to strutted film 1. In this step a coupling orifice 5 has been provided by punching or drilling means well known in the art. As can be seen in FIG. 4, a coupling orifice sequentially passes through strutted film 1, adhesive 7, strutted film 1, adhesive 7 and conduit 4 so that passageway 6 is transversely accessible from the exterior of the structure. The number of sequential layers of strutted film 1 and adhesive 7 as outlined above will vary with the number of times strutted film 1 is wound about conduit 4. However, while this feature is not critical, it is preferable that the strutted film 1 is wound at least one and one-half full revolutions about conduit 4. Such action results in a superior joining of conduit 4 to strutted film 1 and, additionally, provides an appropriate area for passage of coupling orifice 5.

FIG. 5 illustrates the final assembled product of this first embodiment of the present invention, once again, in cross-sectional perspective along line A—A of FIG. 1. At this stage of assembly a patch 8 is externally placed over coupling orifice 5. Patch 8 may be a pressure sensitive tape or, preferably, a material which is heat sealable to the exterior layer of strutted film 1. As a matter of fact, if the exterior layer of strutted film 1 is a heat sealable material such as, for example, heat sealable polyethylene, patch 8 may, likewise, be heat sealable polyethylene.

At this point the struts 2 of strutted film 1 may be inflated as illustrated in FIG. 5 with air, water or any other appropriate medium. The inflation is easily accomplished by supplying the medium through passageway 6 of conduit 4. The medium, if sufficiently pressurized, will pass through coupling orifice 5 and into and through strut 2 of strutted film 1. Accordingly, the sought for flow pattern will have been achieved.

FIGS. 6 and 7 illustrate a second embodiment of the present invention with FIG. 6 illustrating a first assembly step of said second embodiment wherein a sheet of film 9 which, preferably, is heat sealable to both strutted film 1 and conduit 4 is placed between conduit 4 and strutted film 1 as indicated. Preferably, film 9 is a homopolymer or copolymer of polyethylene. However, in general, any heat sealable film is preferrable. At this point nail 10, which is made from a hard plastic such as nylon or polyester or, alternatively, metal, is punched (indicated by arrow C) through strutted film 1, film 9, and conduit 4 so that nail tip 11 completely enters passageway 6 of conduit 4. Nail tip 11 thereby creates a coupling orifice 5 which provides communication from the interior of strut 2 to passageway 6. This communication may be assisted by providing the shank of nail 10 with a longitudinally fluted or grooved surface. Film 9 is then folded, as indicated by arrow D, to the alignment indicated in phantom at 9a. Lastly, the film 9 which is, at this point, sheathing the end of strutted film 1, (see FIG. 7) is pressed, as indicated by arrow E into contact with conduit 4. The entire structure is then, preferably, heat sealed so that a fluid tight communication between passageway 6 and the interior of strut 2 exits.

Of particular note in the embodiment of FIGS. 6 and 7 is that film 9 performs the multiple functions of sheathing and sealing the open end of strut 2, attaching the strutted film 1 to conduit 4, and covering and closing the puncture created by nail 10 in the surface of strutted film 1. This action on the part of film 9 results in the formation of a flow path for fluid tight communication between struts 2 and conduit 4.

If film 9 is not heat sealable, a suitable, fluid tight, adhesive is appropriately applied between film 9 and conduit 4 and also between film 9 and strutted film 1 and film 9 is once again pressed as indicated by arrow E into contact with conduit 4. This method of forming the fluid tight sealing of strutted film 1 to conduit 4 is less preferred but adequate when heat sealing methods may not be utilized.

Both embodiments of the present inventive method may also be utilized to provide a manifold for a group of individual tubes. In this instance each tube (corresponding to strut 2 in the drawings) would be individually connected to conduit 4 in a fluid tight manner in accordance with either of the above-discussed embodiments. This application is particularly useful where there is a desire to tailor the size and shape of the solar panel or irrigation system to a particular area. The structure is also useful when there is no desire to block the rays of the sun or inhibit plant growth as is possible when a single opaque strutted film is utilized.

In view of the foregoing I claim:

1. A process for joining a conduit having an internal passageway to a film having internal struts and providing fluid tight communication between said struts and said passageway comprising:
    applying an adhesive to said conduit;
    applying said strutted film to said adhesive;
    winding said strutted film about said conduit whereby said adhesive and said strutted film encircles said conduit;
    providing a coupling orifice in communication with said passageway and a strut; and
    applying a patch over an exterior opening of said coupling orifice.

2. The process of claim 1, wherein said adhesive is a hot melt blend of an ethylene vinyl acetate polymer and a low molecular weight hydrocarbon tackifier.

3. The process of claim 1, wherein said adhesive is crosslinkable.

4. The process of claim 1, wherein said patch is a pressure sensitive tape.

5. The process of claim 1, wherein said patch is heat sealed to said strutted film.

6. A process for joining a conduit having an internal passageway to a film having internal struts and providing fluid tight communication between said struts and said passageway comprising:
    providing a heat sealable film between said conduit and said strutted film;
    providing a coupling orifice in communication with said passageway;
    folding said heat sealable film so as to sheath said strutted film and overlie an exterior opening of said coupling orifice; and
    heat sealing said heat sealable film whereby said strutted film is joined to said conduit and said exterior opening is closed.

7. The process of claim 6, wherein said coupling orifice is provided by passing a nail through said strutted film, said heat sealable film and said conduit.

8. The process of claim 6, wherein said heat sealable film is polyethylene.

9. The process of claim 7, wherein said nail comprises a grooved surface.

10. The process of claims 1 or 6, wherein individual struts are joined to said conduit.

* * * * *